(12) United States Patent
Chen et al.

(10) Patent No.: US 11,546,440 B2
(45) Date of Patent: *Jan. 3, 2023

(54) SYSTEMS AND METHODS FOR TRACKING SHARING OF WEB CONTENT (71) Applicant: Verizon Media Inc., Dulles, VA (US)

(72) Inventors: Huan-Ling Chen, New York, NY (US); Dmytro Solomakha, Jersey City, NJ (US)

(73) Assignee: Yahoo Ad Tech LLC, Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/094,510

(22) Filed: Nov. 10, 2020

(65) Prior Publication Data
US 2021/0058475 A1 Feb. 25, 2021

Related U.S. Application Data (63) Continuation of application No. 15/377,180, filed on Dec. 13, 2016, now Pat. No. 10,868,878, which is a continuation of application No. 14/332,095, filed on Jul. 15, 2014, now Pat. No. 9,537,963.

(51) Int. Cl.
G06F 15/16 (2006.01)
H04L 67/50 (2022.01)
G06F 16/955 (2019.01)
G06F 16/958 (2019.01)
G06F 16/901 (2019.01)
H04L 43/10 (2022.01)
H04L 67/02 (2022.01)

(52) U.S. Cl.
CPC ........ H04L 67/535 (2022.05); G06F 16/9027 (2019.01); G06F 16/955 (2019.01); G06F 16/958 (2019.01); G06F 16/9566 (2019.01); H04L 43/10 (2013.01); H04L 67/02 (2013.01)

(58) Field of Classification Search
CPC ......... H04L 67/22; H04L 43/10; H04L 67/02; H04L 67/535; G06F 16/955; G06F 16/958; G06F 16/9027; G06F 16/9566
USPC .................................................. 709/217, 224
See application file for complete search history.

(56) References Cited

U.S. PATENT DOCUMENTS 6,839,680 B1 1/2005 Liu et al.
8,126,962 B1 2/2012 Schnedler et al.
(Continued)

OTHER PUBLICATIONS

Extended European Search Report dated Nov. 13, 2015, in corresponding European Patent Application No. EP 15 176 695.3, filed on Jul. 14, 2015 (13 pages).

Primary Examiner — Johnny B Aguiar
(74) Attorney, Agent, or Firm — Bookoff McAndrews, PLLC (57) ABSTRACT

Systems and methods are provided for tracking sharing of an electronic content. An exemplary method may include receiving a request to access content associated with a web address by a user. Based on a unique identity assigned to the user and the web address, a unique tracking web address may be generated. This tracking web address may be shared with additional users. As other users request content associated with the tracking web address, information regarding the sharing of the electronic content may be determined and stored, allowing for tracking of sharing behavior of users.

18 Claims, 4 Drawing Sheets

(56) References Cited

U.S. PATENT DOCUMENTS

| | | | |
|---|---|---|---|
| 8,190,711 B1* | 5/2012 | Borodich | H04L 67/22 709/219 |
| 2006/0005036 A1 | 1/2006 | Hu et al. | |
| 2006/0095558 A1 | 5/2006 | Christian | |
| 2007/0083640 A1 | 4/2007 | Wagner et al. | |
| 2009/0282052 A1 | 11/2009 | Evans et al. | |
| 2010/0299183 A1* | 11/2010 | Fujioka | G06Q 10/00 705/14.4 |
| 2011/0313996 A1* | 12/2011 | Strauss | G06Q 30/0242 707/709 |
| 2012/0271719 A1* | 10/2012 | Straley | G06Q 30/02 705/14.66 |
| 2013/0227057 A1* | 8/2013 | Goldstein | H04L 43/08 709/217 |
| 2014/0025478 A1 | 1/2014 | Mischuk | |
| 2014/0108531 A1* | 4/2014 | Klau | H04N 21/2743 709/204 |
| 2014/0278864 A1 | 9/2014 | Stanislaw et al. | |
| 2015/0304156 A1* | 10/2015 | Chun | H04L 67/22 370/474 |
| 2015/0372885 A1* | 12/2015 | Chun | G06F 16/9566 709/224 |

* cited by examiner

SYSTEMS AND METHODS FOR TRACKING SHARING OF WEB CONTENT

CROSS-REFERENCE TO RELATED APPLICATIONS

This application is a continuation of, and claims the benefit of priority to, U.S. patent application Ser. No. 15/377,180, filed on Dec. 13, 2016, which is a continuation of, and claims the benefit of priority to, U.S. patent application Ser. No. 14/332,095, filed on Jul. 15, 2014, now U.S. Pat. No. 9,537,963, issued Jan. 3, 2017, each of which is incorporated herein by reference in its entirety.

TECHNICAL FIELD

Various embodiments of the present disclosure relate generally to tracking sharing of web content. More specifically, particular embodiments of the present disclosure relate to systems and methods for tracking sharing of web content by generating unique tracking web addresses based on unique identities of users to allow for accurate tracking of any shares.

BACKGROUND

Typically, online publishers, such as online media companies and other publishers of articles, stories, and other electronic content, provide their content on online web pages. Users often share websites and online content with other users. This sharing can be done in many forms, such as sharing of content-provider generated uniform resource locators ("URLs") or "links" based on selection of a "share" button or a simple cutting-and-pasting of a URL and then forwarding it by various messaging techniques including e-mail, online chat service, social medial platform, SMS, and MMS, etc. The prevalent way to track sharing of links is based on activity within a browser-based user interface. For example, many websites include widgets or plug-ins by which users may enter the e-mail address or other identifier of the users with whom the initial user wishes to share the content. As a result, website owners can understand which users are sharing content, and whom they are sharing the content with.

However, it can be difficult for a content provider to efficiently track sharing of links of content accurately if a user shares a link using any other method which cannot be clearly tracked in a browser-based user interface, such as by copying the link and sharing it in a text message, or by sharing it through an operating system's "share" function. This difficulty can be especially difficult in the mobile environment where users are less likely to use a widget or other means that provides website owners with access to the addresses or other identifiers of a user's sharing recipients. For example, the tracking of sharing can be especially difficult if a user simply copies a URL and pastes it into a text message or e-mail.

The present disclosure is directed to overcoming the above-mentioned challenges of tracking sharing of web-based content.

SUMMARY OF THE DISCLOSURE

Embodiments disclose systems and methods for tracking sharing of electronic content.

According to certain embodiments, computer-implemented methods are disclosed for tracking sharing of web content. In an exemplary method, the method includes: receiving, by a processor, a request from a first user to access content associated with a first web address; determining whether a unique identity is assigned to the user and, if not, assigning the unique identity to the first user; generating a tracking web address based on the first web address and the unique identity assigned to the first user; retrieving displayable content associated with the first web address; providing the retrieved displayable content and the tracking web address for display by one or more user interfaces; storing information related to the generation of the tracking web address in a database; receiving an additional request from an additional user to access content associated with the tracking web address; retrieving information related to the tracking web address; determining whether a respective unique identity is assigned to the additional user and, if not, assigning the respective unique identity to the additional user; generating an additional tracking web address based on the first web address and the respective unique identity assigned to the additional user; and storing information related to the additional request and the generation of the additional tracking web address in the database.

According to certain embodiments, systems are disclosed for optimizing of displays in one or more user interfaces. One system includes a memory having processor-readable instructions stored therein; and a processor configured to access the memory and execute the processor-readable instructions, which when executed by the processor configures the processor to perform a method. In an exemplary method, the method includes receiving, by a processor, a request from a first user to access content associated with a first web address; determining whether a unique identity is assigned to the user and, if not, assigning the unique identity to the first user; generating a tracking web address based on the first web address and the unique identity assigned to the first user; retrieving displayable content associated with the first web address; providing the retrieved displayable content and the tracking web address for display by one or more user interfaces; storing information related to the generation of the tracking web address in a database; receiving an additional request from an additional user to access content associated with the tracking web address; retrieving information related to the tracking web address; determining whether a respective unique identity is assigned to the additional user and, if not, assigning the respective unique identity to the additional user; generating an additional tracking web address based on the first web address and the respective unique identity assigned to the additional user; and storing information related to the additional request and the generation of the additional tracking web address in the database.

According to certain embodiments, a non-transitory computer readable medium is disclosed as storing instructions that, when executed by a computer, cause the computer to perform a method, the method includes receiving, by a processor, a request from a first user to access content associated with a first web address; determining whether a unique identity is assigned to the user and, if not, assigning the unique identity to the first user; generating a tracking web address based on the first web address and the unique identity assigned to the first user; retrieving displayable content associated with the first web address; providing the retrieved displayable content and the tracking web address for display by one or more user interfaces; storing information related to the generation of the tracking web address in a database; receiving an additional request from an additional user to access content associated with the tracking web address; retrieving information related to the tracking web address; determining whether a respective unique identity is assigned to the additional user and, if not, assigning the respective unique identity to the additional user; generating an additional tracking web address based on the first web address and the respective unique identity assigned to the additional user; and storing information related to the additional request and the generation of the additional tracking web address in the database.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

While the present disclosure is described herein with reference to illustrative embodiments for particular applications, it should be understood that embodiments of the present disclosure are not limited thereto. Other embodiments are possible, and modifications can be made to the described embodiments within the spirit and scope of the teachings herein, as they may be applied to the above-noted field of the present disclosure or to any additional fields in which such embodiments would be of significant utility.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In view of the challenges associated with the conventional techniques outlined above, systems and methods are disclosed herein for tracking sharing of web content. That is, methods allow for the creation of a database that tracks and maps out an impact of a particular user's sharing of a URL or link. The method may be accomplished by, in response to a user request to access a web address, first generating a tracking web address that is a unique web address specifically associated with the particular user attempting to access content associated with the web address. Accordingly, information related to the tracking web address may indicate that it is associated with content at the original web address and characteristics of the specific user. Thereafter, the content associated with the web address may be displayed along with the tracking web address to the user. That is, an address bar in an interface, or an embedded sharing button presented in the interface, will display (or include) the tracking web address instead of the web address. Accordingly, when a user copies the URL to share, and/or makes a selection for sharing the URL, the tracking web addresses may be shared. Accordingly, when another user attempts to access the tracking web address, a determination may be made that a user's sharing of a tracking web address associated with that user led to a conversion by another user. This may enable creation of a database containing data reflecting the chain of how a link to a web address associated with electronic content is shared.

In other words, each share act may be tagged with a unique token per sender, and the token may be embedded in the shared URL. This enables the use of tracking that is independent from the participation of a particular browser and/or operating system mechanism. When an address is accessed by another device it may be considered to be a successful "click through" or "conversion." It may not be necessary to have the other path information in the URL. For example, if a user were to share a web page having the URL: "m.huffpost.com/us/entry/123456" (where the suffix, in this case a numerical, is an entry ID of a particular web page, article, or other content), a related tracking URL may be generated in the form: "m.huffpost.com/abcde" where the suffix, in this case alpha-numeric, is a token that uniquely identifies the shared page and the user who shared it, among other data of interest for the purpose of tracking. For example, in some cases, it may be desirable to store additional detailed information about the device, user, sharing history etc. (e.g., IP-address, location, device, etc.).

For purposes of example, when a user (i.e., the sharer) visits a web page (e.g., "m.huffpost.com/us/entry/123456"), a token may be generated, and the method may involve storing all desired information associated with the user and the page to a database, using the token as key and all the other fields as values. For example, the token "abcde" may be generated and stored as a record to the database as: "abcde"→(path: "m.huffpost.com/us/entry/123456", user-info: { . . . }). The user may then be silently redirected to the token-based URL (example: "m.huffpost.com/abcde"). This can be done using a server side "302" redirect, or links can be prepared and embedded in a web page before they are even shown to user. Now, when the user shares the page using any type of native sharing mechanism (e.g., using a share button), or even copies the URL from a browser address field and sends it manually using any messaging service, it may instead be the token-based URL that is shared. Since the token-based URL is indexed or otherwise associated with prior user, timing, demographics, etc. the token-based URL may be considered the "tracking URL" or "tracking address" that enables further analysis and understanding of user sharing behavior.

Specifically, when another user (i.e., the recipient of a share) sees the shared tracking URL and clicks or otherwise selects it, the database may be checked to see which page should be shown and with which sharer the subsequent visit can be attributed to. In other words, it can be determined who, i.e., which sharer, was responsible for the subsequent visit. The method may then involve counting or otherwise evaluating the number of times the share link was followed by a unique device/user, and in some cases counting the number of successful "conversions," or click-throughs to a shared tracking URL. User information in the database can be used to count "conversion rate" per location, per OS, etc.

In some additional embodiments, the method may involve establishing a ranking system and identifying who sends out the most clicked through shares and can be labeled as a "power sender." The method may also involve identifying those networks and spread content from these influential sharers.

Reference will now be made in detail to the exemplary embodiments of the disclosure, examples of which are illustrated in the accompanying drawings. Wherever possible, the same reference numbers will be used throughout the drawings to refer to the same or like parts.

Figure 1:
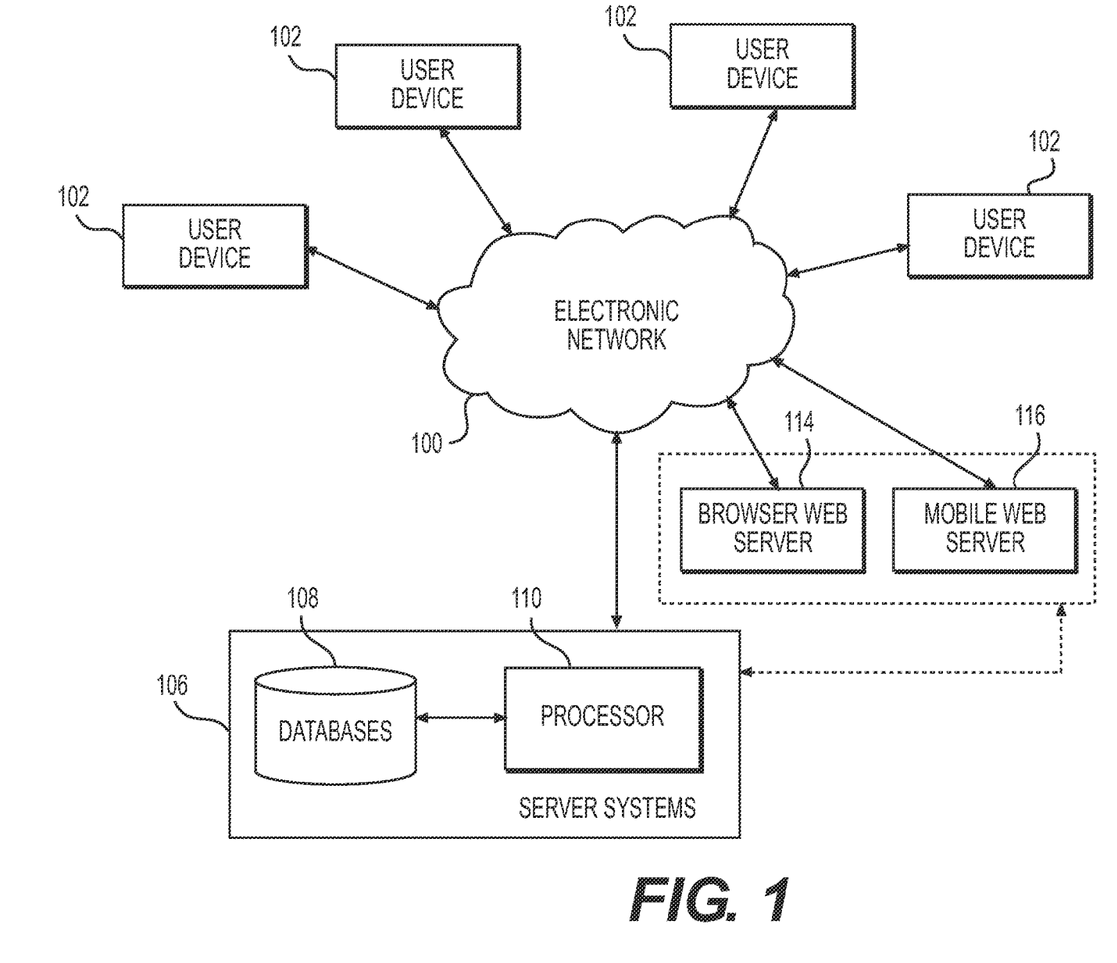
FIG. 1 is a schematic diagram of a network environment for tracking sharing of electronic content, according to an embodiment of the present disclosure.

FIG. 1 is a schematic diagram of an exemplary network environment in which sharing of electronic content may be tracked, according to an embodiment of the present disclosure. As shown in FIG. 1, the environment may include a plurality of user or client devices 102 that are communicatively coupled to each other as well as plurality of server systems 106, a browser web server 114, and/or a mobile web server 116 via an electronic network 100. Electronic network 100 may include one or a combination of wired and/or wireless electronic networks. Network 100 may also include a local area network, a medium area network, or a wide area network, such as the Internet.

In one embodiment, each of user or client devices 102 may be any type of computing device configured to send and receive different types of content and data to and from various computing devices via network 100. Examples of such a computing device include, but are not limited to, a desktop computer or workstation, a laptop computer, a mobile handset, a personal digital assistant (PDA), a cellular telephone, a network appliance, a camera, a smart phone, an enhanced general packet radio service (EGPRS) mobile phone, a media player, a navigation device, a game console, a set-top box, or any combination of these or other types of computing devices having at least one processor, a local memory, a display (e.g., a monitor or touchscreen display), one or more user input devices, and a network communication interface. The user input device(s) may include any type or combination of input/output devices, such as a keyboard, touchpad, mouse, touchscreen, camera, and/or microphone.

In one embodiment, each of the user or client devices 102 may be configured to execute a web browser or mobile browser installed for displaying various types of content and data received from any of server systems 106 and/or web servers 114 and 116 via network 100. Server systems 106 in turn may be configured to receive data related to user interaction with the web browsers or mobile browsers displayed in the user or client devices 102. The user interaction may occur at each device 102 through an interface provided on a web page loaded within the browser executable at each device. For example, server systems 106 may receive data related to selection or clicking of an item displayed on a webpage. This may include a web address or a URL. In embodiments, each of the user or client derives 102 may be configured to send messages to the other user or client devices using text messaging, a messaging application, and other similar communication channels.

While browser web server 114 and mobile web server 116 are shown separately in FIG. 1, it should be noted that web servers 114 and 116 may be implemented using a single server device or system. In an example, such a single server may be a web server that is configured to provide different versions of a web page and associated content to each of user/commenter devices 102 according to the type of device or web browser executable at the device. The different versions of the web page may include, for example, a desktop version and a mobile version, for which the web page content may be formatted appropriately for display via the particular type of browser at the device. Further, any of the devices or functionality of server systems 106, browser web server 114, and/or a mobile web server 116 may be combined together or separated, and may be operated by a single administrative entity, or outsourced to one or more other entities, such as a web hosting entity, web storage entity, and/or cloud computing service, possibly disposed remotely of each other.

Also, as shown in FIG. 1, server systems 106 may include one or more databases 108. In an embodiment, databases 108 may be any type of data store or recording medium that may be used to store any type of data. For example, databases 108 may store web addresses, information related to linkages between web addresses and IP addresses, tracking web addresses, information related to hierarchical relationships between users with respect to a particular web address, information related to hierarchical relationships between a web address and tracking web addresses, etc.

Figure 2:
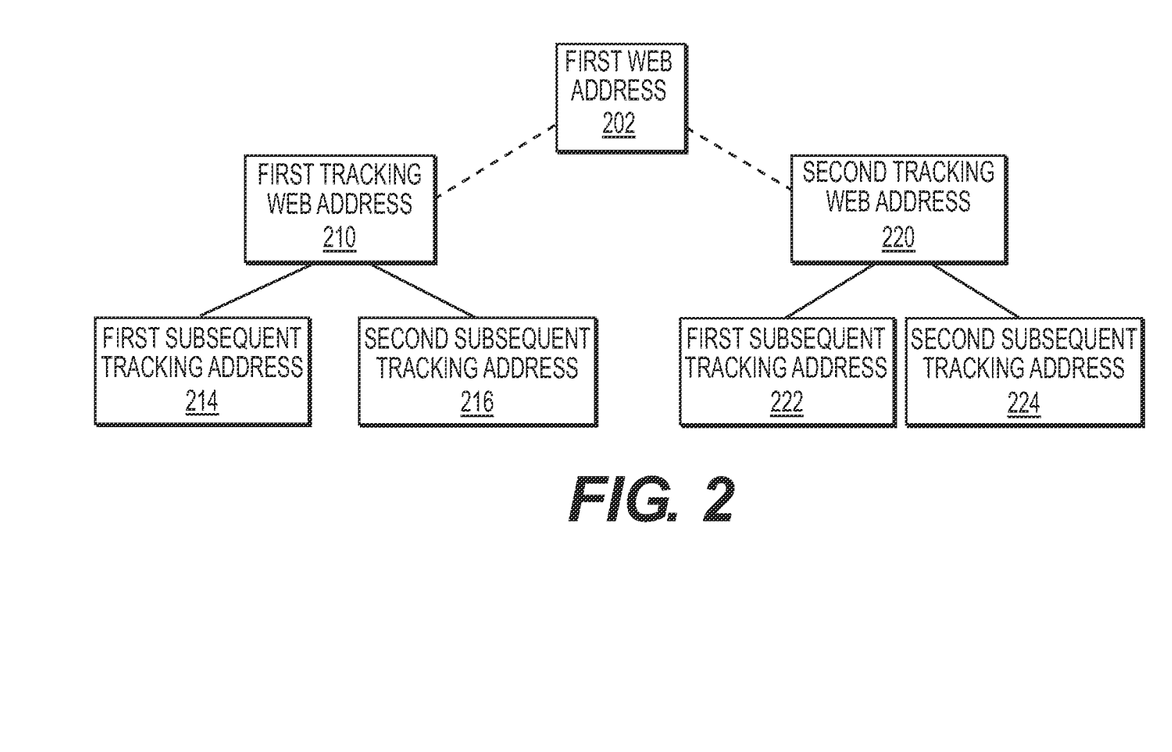
FIG. 2 illustrates an exemplary hierarchical relationship between a web address and tracking web addresses, according to an embodiment of the present disclosure.

For example, FIG. 2 illustrates an exemplary hierarchical relationship between a web address and tracking web addresses, according to an embodiment of the present disclosure. The hierarchical relationship may begin with a first web address 202. Databases 108 may store information related to the first web address 202, including an IP address associated with the first web address, content stored at the IP address, etc. As a first user attempts to access data of the first web address 202, a first tracking web address 210 may be generated. The first tracking web address 210 may be considered a root of a first hierarchical tree. The first tracking web address 210 may include a unique token, which points to the content associated with the first web address 202 and the first user's unique identity. The first user may then share the first tracking web address 210 with one or more additional users.

As additional users, for example a second and third user, attempt to access the first tracking web address 210, additional tracking web addresses 214, 216 may be generated, and information related to this association and dependency may be stored in the hierarchical database. For example, a first subsequent tracking web address 214 may be generated when the second user attempts to access content associated with the first tracking web address 210. Similarly, a second subsequent tracking web address 216 may be generated when the third user attempts to access content associated with the first tracking web address 210. Accordingly, in this manner, multiple additional layers may be included below subsequent tracking addresses 214 and 216 indicating the sharing of content originally by the first user associated with first tracking web address 210.

To continue this example, if a fourth user attempts to access content associated with the first web address 202, utilizing the first web address 202 instead of the first tracking web address 210, then a second hierarchical relationship will be stored in database 108. For example, a second tracking web address 220 would be generated, and may be considered a root of a second hierarchical tree. The second tracking web address 220 may represent and include another unique token, which points to the content associated with the first web address and the fourth user's unique identity. The fourth user may then share the second tracking web address 220 with one or more additional users. As additional users, for example the second and the third users or other users, attempt to access the second tracking web address 220, additional tracking web addresses 222, 224 may be generated, and information related to this association and dependency, again, may be stored in the hierarchical database. For example, similar to additional tracking web addresses 214 and 216 representing subsequent tracking web addresses dependent on first tracking web address 210, similarly, subsequent tracking web addresses 222 and 224 with similar characteristics may be generated depending on second tracking web address 220.

Additionally, as shown in the example of FIG. 1, server systems 106 may include processor 110. In an embodiment, processor 110 may be configured to execute a process for tracking sharing of internet content, as will be described in further detail below. The optimization method may, for example, generate tracking web addresses and then track attempts at accessing content related to the generated tracking web addresses.

In an embodiment, processor 110 may be configured to receive instructions and content from various sources including user or client devices 102 and store the received content within databases 108. In some implementations, any received data may be stored in the databases 108 in an encrypted form to increase security of the data against unauthorized access. Processor 110 or any additional processors within server systems 106 may also be configured to provide content for display to client or user devices 102. The displayed content may include, for example, user-generated content that has been processed or received and URL information. For example, optimizing processor 110 may transmit web page content along with the generated tracking web address.

In an embodiment, processor 110 may be able to conduct data analysis using the stored data related to tracking of sharing content, such as, for example, using the data as presented in FIG. 2. This may include establishing a ranking system for users with the most number of conversions, that is, the most times an additional unique user or person clicked a link based on sharing by a first user. It may include an analysis and application of a metric of a particular user's influence. For example, one particular user's shares may lead to a much larger number of shares. Alternatively, a user may have a large number of particular shares in specific demographics. This information may be utilized to provide tracking of additional content (such as advertisements) along with the primary content associated with a web address.

Figure 3:
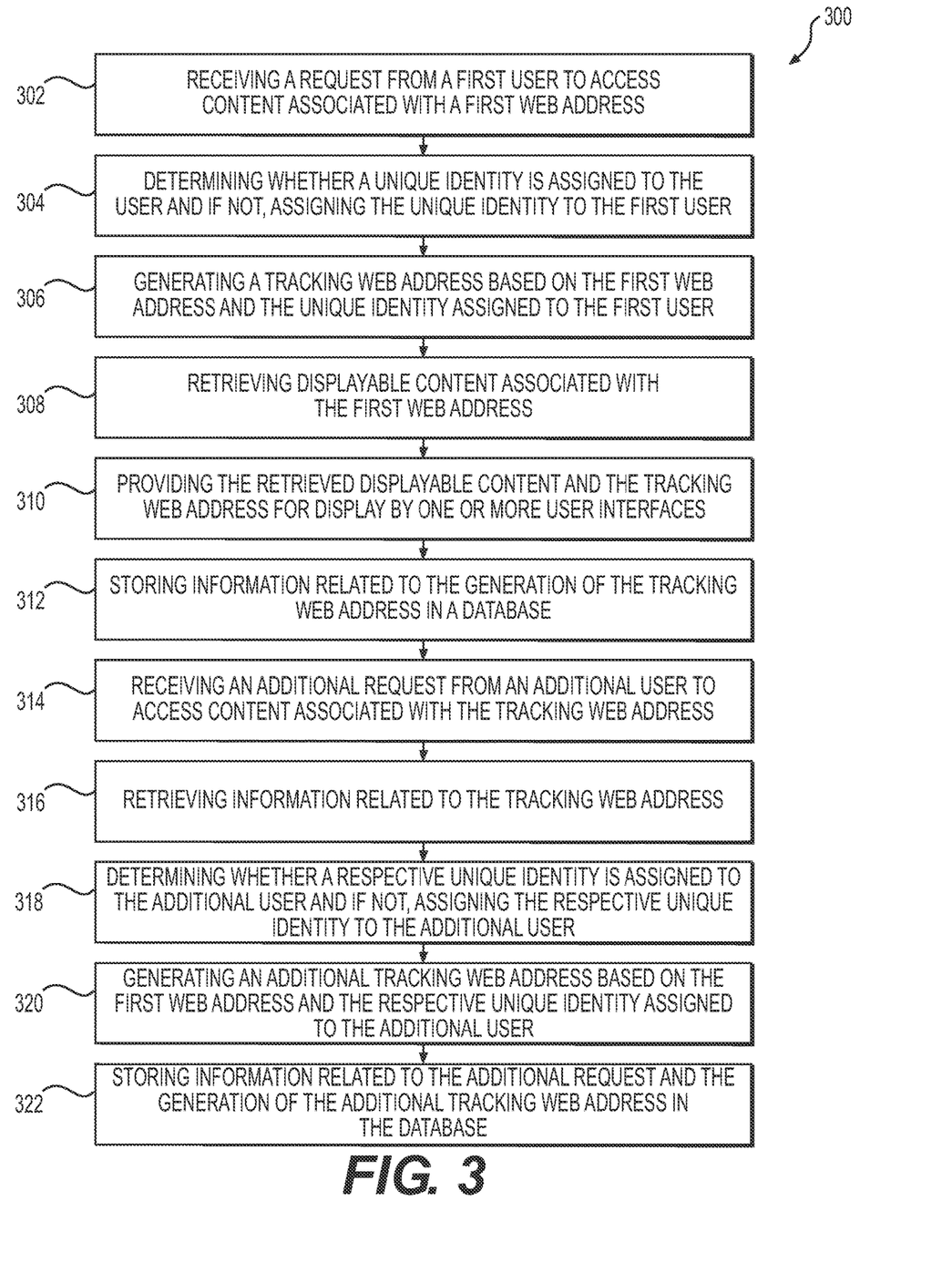
FIG. 3 is a flow diagram of an exemplary method for tracking sharing of electronic content, according to an embodiment of the present disclosure.

FIG. 3 is a flow diagram of a method 300 for sharing tracking of web content, according to an embodiment of the present disclosure.

Step 302 of method 300 may include receiving a request from a first user to access content associated with a first web address. For example, a first web address may be www.sampleaddress.com/123456 for which the first user seeks to access content. The request may be received by processor 110 from any of user or client devices 102.

Step 304 of method 300 may include determining whether a unique identity is assigned to the user and if not, assigning the unique identity to the first user. For example, data may be retrieved from database 108 that includes information associated with users who may have accessed information before. Accordingly, unique identities may have been assigned to each of these users. Identifying information regarding a particular user may be used for comparing pre-stored information regarding users and their identities. Identifying information may include IP addresses, locations, devices, etc. If no such identity has been assigned to a unique user, then an identity is assigned to the user, where the assigned identity corresponds to the identifying information. The unique identity may be a number, additional designation, or any other suitable naming of identifying convention, consistent with principles of the present disclosure.

Step 306 of method 300 may include generating a tracking web address based on the first web address and the unique identity assigned to the first user. For example, continuing the example from step 302, a unique token may be generated based on the www.sampleaddress.com/123456 and the unique identity assigned to the first user. For example, a unique token "abcdef" may be uniquely generated and incorporated into a unique tracking web address: www.sampleaddress.com/abcdef, which may be associated with the first web address and the identity of the first user.

Step 308 of method 300 may include retrieving displayable content associated with the first web address. For example, the web address is generally mapped to an IP address storing displayable content. The displayable content associated with the web address may be retrieved from browser web server 114, mobile web server 116, or any other sources within environment 100 where displayable content is stored.

Step 310 of method 300 may include providing the retrieved displayable content and the tracking web address for display by one or more user interfaces. In some embodiments, the tracking web address may be provided in a URL address section of a display. In additional embodiments, the tracking web address may be embedded within a webpage to be displayed on a user interface. For example, in response to selection of a "share" button on a webpage that includes the displayable content and the tracking web address, the tracking web address would be shared.

Step 312 of method 300 may include storing information related to the generation of the tracking web address in a database. For example, information regarding the unique identity and the web address associated with the tracking web address may be stored in databases 108. Storing such information enables for tracking any sharing of this web content, since every time another user attempts to access the tracking web address, it can be determined that the content was shared by a user associated with the tracking web address. In an exemplary embodiment, the information related to the generation of the tracking web address may be stored as exemplary hierarchical data presented in FIG. 2. However, data related to the generation, including relationship to original web address, unique identity of user, etc. may be stored in the database, no matter the structure of the stored data.

Step 314 of method 300 may include receiving an additional request from an additional user to access content associated with the tracking web address. For example, an additional user may request to access content associated with tracking web address www.sampleaddress.com/abcde.

Step 316 of method 300 may include retrieving information related to the tracking web address. This information may include the web address and the unique identity associated with the particular tracking web address. For example, data stored in databases 108 may be retrieved, where the data includes the identity of the original user sharing the content, in addition to the IP address associated with web address or original user.

Step 318 of method 300 may include determining whether a respective unique identity is assigned to the additional user and, if not, assigning the respective unique identity to the additional user. This step may be performed similarly to step 304, as explained above. For example, data may be retrieved from database 108, which includes information associated with users who may have accessed information before. Accordingly, unique identities may have been assigned to each of these users. Identifying information regarding a particular user may be used for comparing pre-stored information regarding users and their identities. Identifying information may include IP addresses, locations, devices, etc. If no such identity has been assigned to a unique user, then an identity is assigned to the user, where the assigned identity corresponds to the identifying information. The unique identity may be a number, additional designation, or any other suitable naming of identifying convention, consistent with principles of the present disclosure.

Step 320 of method 300 may include generating an additional tracking web address based on the first web address and the respective unique identity assigned to the additional user. Step 320 may be performed similarly to step 306 explained above. For example, continuing the example from above, a unique token may be generated based on the first web address, www.sampleaddress.com/123456, and the unique identity assigned to the second user. For example, a unique token "wxyz" may be uniquely generated and incorporated into a unique subsequent tracking web address, www.sampleaddress.com/wxyz, which may be associated with the first web address and the identity of the first user.

Step 322 of method 200 may include storing information related to the additional request and the generation of the additional tracking web address in the database. For example, this stored information may include a relationship between the first user and the additional user with respect the displayed content associated with the web address. Furthermore, the stored information may contextualize the relationship between two or more of the unique identities, the web addresses, the tracking web address, the additional tracking web address, etc. This information may be stored in a database, index, and/or any other table or data structure. In embodiments, the information may define a hierarchical relationship between the first user and the one or more additional users for accessing content related to the web address in the database. In such a scenario, the first user is a root of the hierarchical relationship with respect to the content of the web address. For example, in FIG. 2, first tracking web address 210 may represent the information stored in step 312, first subsequent tracking address 214 may represent the information stored in step 322.

In embodiments, additional layers may be added to the hierarchical data tree based on additional requests for electronic content using the additional tracking web addresses. Accordingly, more nodes to the hierarchical tree may be continually added to gather data regarding sharing behavior.

FIGS. 1-3, or any part(s) or function(s) thereof, may be implemented using hardware, software modules, firmware, tangible computer readable media having instructions stored thereon, or a combination thereof and may be implemented in one or more computer systems or other processing systems.

Figure 4:
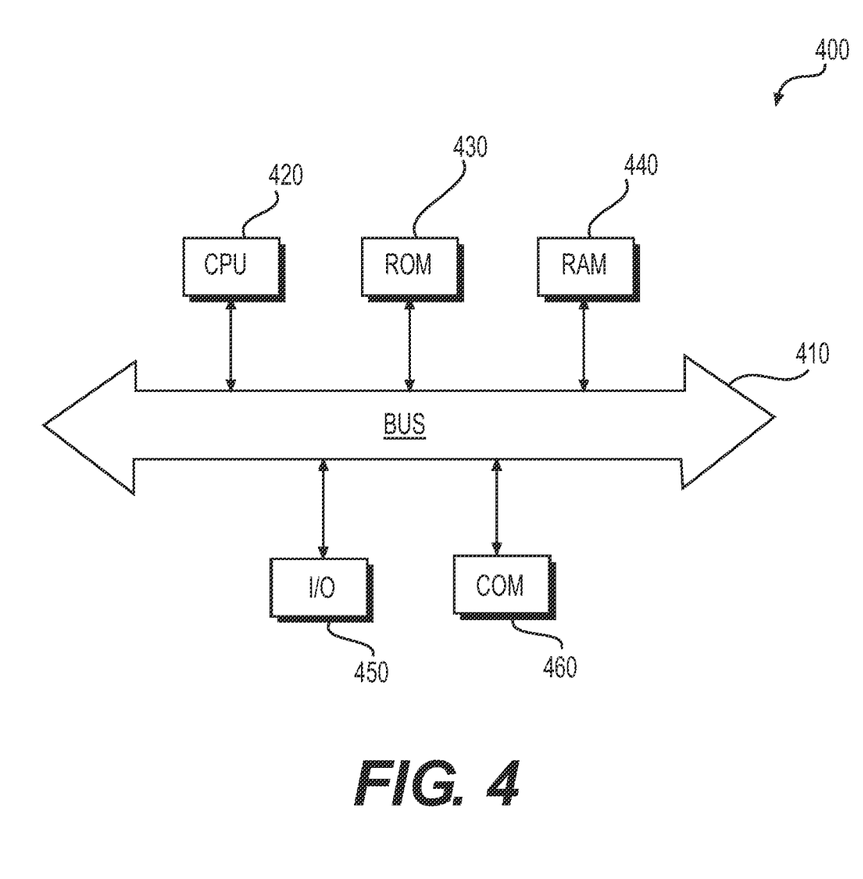
FIG. 4 is a block diagram of an exemplary computer system in which embodiments of the present disclosure may be implemented.

FIG. 4 illustrates a high-level functional block diagram of an exemplary computer system 400, in which embodiments of the present disclosure, or portions thereof, may be implemented, e.g., as computer-readable code. For example, each of the exemplary devices and systems described above with respect to FIGS. 1-3 can be implemented in computer system 400 using hardware, software, firmware, tangible computer readable media having instructions stored thereon, or a combination thereof and may be implemented in one or more computer systems or other processing systems. Hardware, software, or any combination of such may embody any of the modules and components in FIG. 1, as described above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device. For instance, at least one processor device and a memory may be used to implement the above-described embodiments. A processor device may be a single processor, a plurality of processors, or combinations thereof. Processor devices may have one or more processor "cores."

Various embodiments of the present disclosure, as described above in the examples of FIGS. 1-3 may be implemented using computer system 400. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 4, computer system 400 includes a central processing unit (CPU) 420. CPU 420 may be any type of processor device including, for example, any type of special purpose or a general-purpose microprocessor device. As will be appreciated by persons skilled in the relevant art, CPU 420 also may be a single processor in a multi-core/multiprocessor system, such system operating alone, or in a cluster of computing devices operating in a cluster or server farm. CPU 420 is connected to a data communication infrastructure 410, for example, a bus, message queue, network, or multi-core message-passing scheme.

Computer system 400 also includes a main memory 440, for example, random access memory (RAM), and may also include a secondary memory 430. Secondary memory 430, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 430 may include other similar means for allowing computer programs or other instructions to be loaded into computer system 400. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to computer system 400.

Computer system 400 may also include a communications interface ("COM") 460. Communications interface 460 allows software and data to be transferred between computer system 400 and external devices. Communications interface 460 may include a modem, a network interface (such as an Ethernet card), a communications port, a PCM-CIA slot and card, or the like. Software and data transferred via communications interface 460 may be in the form of signals, which may be electronic, electromagnetic, optical, or other signals capable of being received by communications interface 460. These signals may be provided to communications interface 460 via a communications path of computer system 400, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. Computer system 400 also may include input and output ports 450 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

It would also be apparent to one of skill in the relevant art that the present disclosure, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

It is to be understood that both the foregoing general description and the following detailed description are exemplary and explanatory only and are not restrictive of the disclosed embodiments, as claimed.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for tracking sharing of web content, the method comprising:
   receiving, by a processor of a server over an electronic network, a first request to display a base content from a first user device of a first user, wherein the first request to display the base content includes a first web address;
   generating, by the processor of the server, a tracking web address based on the first web address and a unique identity assigned to the first user;
   redirecting the first request to a first copy of the requested base content, wherein the first copy of the requested base content is accessed via the tracking web address, the tracking web address being embedded within the first copy of the requested base content;
   receiving, by the processor of the server, a second request to access content from a second user device of a second user, wherein the second request to access the content is associated with the tracking web address;
   generating a second tracking web address based on the first web address and a unique identity assigned to the second user;
   redirecting the second request to a second copy of the requested base content, wherein the second copy of the requested base content is accessed by the second tracking web address, the second tracking web address being embedded within the second copy of the requested base content;
   storing, in a database, encrypted information related to the tracking web address and the second tracking web address; and
   determining, based at least on the stored encrypted information, a conversion rate per operating system (OS) for the tracking web address or the second tracking web address.

2. The method of claim 1, further comprising:
   retrieving information relating to the tracking web address, wherein the retrieved information includes a web address associated with the tracking web address and a unique identity associated with the tracking web address.

3. The method of claim 1, wherein storing the encrypted information in the database further comprises storing information defining a relationship between a web address associated with the tracking web address, a unique identity associated with the tracking web address, and the tracking web address.

4. The method of claim 1, wherein storing the encrypted information in the database further comprises storing information related to a hierarchical relationship between the first user and the second user for accessing content related to the second tracking web address in the database.

5. The method of claim 4, wherein the hierarchical relationship is defined by a hierarchical relationship tree.

6. The method of claim 5, wherein the first user is a root of the hierarchical relationship tree.

7. The method of claim 4, further comprising:
receiving, over the electronic network, from a third user by way of a third user computing device, a third request from the third user to access content associated with the first web address;
determining whether a respective unique identity is assigned to the third user and if not, assigning the respective unique identity to the third user;
generating a third tracking web address based on the first web address and the respective unique identity assigned to the third user;
providing retrieved displayable content and the third tracking web address for display by one or more user interfaces; and
storing information related to the generation of the third tracking web address in the database, wherein the third user is a root of a third hierarchical relationship tree with respect to the content associated with the first web address in response to any requests by users other than the third user to access contents related to the third tracking web address.

8. A system for tracking sharing of web content, the system comprising:
a memory having processor-readable instructions stored therein; and
a processor of a server configured to access the memory and execute the processor-readable instructions, which when executed by the processor causes the processor to perform operations including:
receiving, by the processor of the server over an electronic network, a first request to display a base content from a first user device of a first user, wherein the first request to display the base content includes a first web address;
generating, by the processor of the server, a tracking web address based on the first web address and a unique identity assigned to the first user;
redirecting the first request to a first copy of the requested base content, wherein the first copy of the requested base content is accessed via the tracking web address, the tracking web address being embedded within the first copy of the requested base content;
receiving, by the processor of the server, a second request to access content from a second user device of a second user, wherein the second request to access the content is associated with the tracking web address;
generating a second tracking web address based on the first web address and a unique identity assigned to the second user;
redirecting the second request to a second copy of the requested base content, wherein the second copy of the requested base content is accessed by the second tracking web address, the second tracking web address being embedded within the second copy of the requested base content;
storing, in a database, encrypted information related to the tracking web address and the second tracking web address; and
determining, based at least on the stored encrypted information, a conversion rate per operating system (OS) for the tracking web address or the second tracking web address.

9. The system of claim 8, wherein the processor is further configured to perform operations including:
retrieving information relating to the tracking web address, wherein the retrieved information includes a web address associated with the tracking web address and a unique identity associated with the tracking web address.

10. The system of claim 8, wherein storing the encrypted information in the database further comprises storing information defining a relationship between a web address associated with the tracking web address, a unique identity associated with the tracking web address, and the tracking web address.

11. The system of claim 8, wherein storing the encrypted information in the database further comprises storing information related to a hierarchical relationship between the first user and the second user for accessing content related to the second tracking web address in the database.

12. The system of claim 11, wherein the hierarchical relationship is defined by a hierarchical relationship tree.

13. The system of claim 12, wherein the first user is a root of the hierarchical relationship tree.

14. The system of claim 11, wherein the processor is further configured to perform operations including:
receiving, over the electronic network, from a third user by way of a third user computing device, a third request from the third user to access content associated with the first web address;
determining whether a respective unique identity is assigned to the third user and if not, assigning the respective unique identity to the third user;
generating a third tracking web address based on the first web address and the respective unique identity assigned to the third user;
providing retrieved displayable content and the third tracking web address for display by one or more user interfaces; and
storing information related to the generation of the third tracking web address in the database, wherein the third user is a root of a third hierarchical relationship tree with respect to the content associated with the first web address in response to any requests by users other than the third user to access contents related to the third tracking web address.

15. A non-transitory computer-readable medium storing instructions, the instructions, when executed by a computer system cause the computer system to perform operations including:
receiving, by a processor of a server over an electronic network, a first request to display a base content from a first user device of a first user, wherein the first request to display the base content includes a first web address;
generating, by the processor of the server, a tracking web address based on the first web address and a unique identity assigned to the first user;
redirecting the first request to a first copy of the requested base content, wherein the first copy of the requested base content is accessed via the tracking web address, the tracking web address being embedded within the first copy of the requested base content;
receiving, by the processor of the server, a second request to access content from a second user device of a second user, wherein the second request to access the content is associated with the tracking web address;

generating a second tracking web address based on the first web address and a unique identity assigned to the second user;

redirecting the second request to a second copy of the requested base content, wherein the second copy of the requested base content is accessed by the second tracking web address, the second tracking web address being embedded within the second copy of the requested base content;

storing, in a database, encrypted information related to the tracking web address and the second tracking web address; and determining, based at least on the stored encrypted information, a conversion rate per operating system (OS) for the tracking web address or the second tracking web address.

16. The non-transitory computer-readable medium of claim 15, wherein the instructions further cause the computer system to perform operations including:

retrieving information relating to the tracking web address, wherein the retrieved information includes a web address associated with the tracking web address and a unique identity associated with the tracking web address.

17. The non-transitory computer-readable medium of claim 15, wherein storing the encrypted information in the database further comprises storing information defining a relationship between a web address associated with the tracking web address, a unique identity associated with the tracking web address, and the tracking web address.

18. The non-transitory computer-readable medium of claim 15, wherein storing the encrypted information in the database further comprises storing information related to a hierarchical relationship between the first user and the second user for accessing content related to the second tracking web address in the database.

* * * * *